(12) United States Patent
Uno et al.

(10) Patent No.: US 6,552,858 B2
(45) Date of Patent: Apr. 22, 2003

(54) OBJECTIVE LENS SYSTEM AND OPTICAL DISK APPARATUS USING THE SAME

(75) Inventors: Kazushi Uno, Kawasaki (JP); Tsuyoshi Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/997,037

(22) Filed: Nov. 29, 2001

(65) Prior Publication Data

US 2002/0172144 A1 Nov. 21, 2002

(30) Foreign Application Priority Data

May 18, 2001 (JP) ........................................ 2001-149765

(51) Int. Cl.$^7$ ........................... G02B 13/18; G02B 3/02; G02B 21/02
(52) U.S. Cl. ........................................ 359/717; 359/661
(58) Field of Search ................................. 359/717, 661; 369/300

(56) References Cited

U.S. PATENT DOCUMENTS 6,236,513 B1 * 5/2001 Mallary ........................ 359/642
2002/0011298 A1 * 1/2002 Jain et al. ........................ 156/60

FOREIGN PATENT DOCUMENTS

JP 11-305135 11/1999
JP 2000-075107 3/2000

* cited by examiner

*Primary Examiner*—Hung Xuan Dang
*Assistant Examiner*—William Choi
(74) *Attorney, Agent, or Firm*—Greer, Burns & Crain, Ltd.

(57) ABSTRACT

An objective lens system includes a first lens and a second lens. The first lens has a first surface for allowing entry of light and a second surface opposite to the first surface. The second lens has a spherical third surface and a flat fourth surface opposite to the third surface. The third surface faces the second surface and has a radius of curvature $r_0$. The second lens has a thickness $d_0$ and a refractive index $n_0$. The thickness $n_0$, the radius of curvature $r_0$ and the refractive index $n_0$ satisfy a relation: $d_0 > r_0 > n_0 d_0$.

8 Claims, 16 Drawing Sheets

FIG.8A

Table 1

| | Design | | | | | | Inductance |
|---|---|---|---|---|---|---|---|
| | (μm) | | | Id/2 (μm) | Inner Margin/2 | Turns (1st layer /2nd layer) | (nH) |
| | W | S | T | | | | |
| Small Coil | 7 | 7 | 3 | 22.2 | 10 μm | 8/7 | 29.4 |
| Large Coil | | | | 32.2 | 20 μm | 9/9 | 55.8 |

FIG.8B

Table 2

| | Reference Refractive Index /Working Distance | $n_1/n_2$ | | |
|---|---|---|---|---|
| | | 1.78/1.79 | 1.78/1.78 | 1.79/1.78 |
| r | 1.78/0.01 μm | 0.8048 | 0.8178 | 0.9339 |
| $d_1$ | | 0.4400 | 0.4038 | 0.4600 |
| $d_2$ | | 0.3644 | 0.4038 | 0.3918 |
| Aberration (mλ rms) | | 13 | 0 | 0 |

FIG.8C

Table 3

| $n_1/n_2$ | Optical Path Length | | |
|---|---|---|---|
| | 0° | 16° | 32° |
| 1.6/1.7 | 1.65 | 1.6520806 | 1.6592613 |
| 1.6/1.6 | 1.6 | 1.6 | 1.6 |
| 1.7/1.7 | 1.7 | 1.7 | 1.7 |
| 1.7/1.6 | 1.65 | 1.6480462 | 1.6413131 |

FIG.8D

Table 4

| Condition | 1 | 2 | 3 |
|---|---|---|---|
| System NA | 0.90 | | |
| Floating Amount | 1 μm | | |
| Wavelength | 405nm | | |
| $n_0$ | 1.62247 | | 1.529724 |
| $d_1$ | 0.773708mm | | |
| $n_2$ | 1.62247 | 1.529724 | |
| $d_2$ | 0.507619mm | | |
| Bonding Layer | Negligible | | |

FIG.8E

Table 5

| Condition | $n_1$ | r [mm] | $(n_1-n_2)/n_2$ | Wavefront Aberration in Case 1 [m$\lambda$ rms] | Wavefront Aberration in Case 2 [m$\lambda$ rms] |
|---|---|---|---|---|---|
| 1 | 1.62247 | 1.27782 | 0 | 30.3 | 64.4 |
|   | 1.680664 | 1.24725 | 0.03587 | 39.6 | 51.9 |
|   | 1.729657 | 1.20039 | 0.06606 | 46.2 | 40.3 |
| 2 | 1.529724 | 1.27387 | 0 | 28.4 | 80.9 |
|   | 1.585978 | 1.24291 | 0.036774 | 38.4 | 63.6 |
|   | 1.631854 | 1.20349 | 0.066764 | 46.3 | 50.7 |
| 3 | 1.529724 | 1.27404 | 0 | 28.1 | 85.3 |
|   | 1.585978 | 1.24170 | 0.036774 | 37.9 | 63.4 |

FIG.8F

Table 6

| | | | Present Invention | Hemisphere Type |
|---|---|---|---|---|
| Aspherical Lens | First Surface | Thickness (mm) | 1.18818 | 1.058248 |
| | | Radius of Curvature (mm) | 2.01651 | 1.95283 |
| | | k | -1.499415 | -1.339753 |
| | Coefficient of Aspheric Surface | a | $1.96294 \times 10^{-2}$ | $2.09202 \times 10^{-2}$ |
| | | b | $-1.27630 \times 10^{-3}$ | $-1.54650 \times 10^{-3}$ |
| | | c | $-1.39705 \times 10^{-4}$ | $-1.91815 \times 10^{-4}$ |
| | | d | $5.15528 \times 10^{-5}$ | $7.09962 \times 10^{-5}$ |
| | Second Surface | Radius of Curvature (mm) | -52.00521 | -33.24227 |
| | | k | -5001.773123 | -4154.985456 |
| | Coefficient of Aspheric Surface | a | $1.25922 \times 10^{-2}$ | $1.33631 \times 10^{-2}$ |
| | | b | $-9.08563 \times 10^{-3}$ | $-9.17041 \times 10^{-3}$ |
| | | c | $2.79142 \times 10^{-3}$ | $2.62659 \times 10^{-3}$ |
| | | d | $-3.22242 \times 10^{-4}$ | $-2.79387 \times 10^{-4}$ |
| Slider | Spherical Element | Radius of Curvature (mm) | 1.24692 | 1.24903 |
| | | Thickness $d_1$ (mm) | 0.773708 | 0.757394 |
| | | Refractive Index $n_1$ | 1.668678 | 1.62247 |
| | Base | Thickness $d_2$ (mm) | 0.5 | 0.5 |
| | | Refractive Index $n_2$ | 1.62247 | 1.62247 |
| | Lens Distance (mm) | | 1.099938 | 1.099859 |

FIG.8G

Table 7

| | | | |
|---|---|---|---|
| Margin | Angle of View $\theta_1$ | 0.3° | — |
| | Thickness Tolerance of Slider $\Delta_1$ | +10 μm | +10 μm |
| | Relative Offset $\Delta_2$ | -10 μm | — |
| | Float Variation $\Delta_3$ | +1 μm | +1 μm |
| | Interfacial Angle $\theta_2$ | 0.034° | — |
| | Surface Offset $D_3$ | +3 μm | — |
| Worst Aberration (mλ rms) | Present Invention | 81.6 | 35.7 |
| | Hemisphere Type | 90 | 28.7 |

OBJECTIVE LENS SYSTEM AND OPTICAL DISK APPARATUS USING THE SAME

BACKGROUND OF THE INVENTION

1. Field of the Invention

The present invention relates to an objective lens system used for an optical disk apparatus, an optical microscope, an image device, etc. It also relates to an optical disk apparatus incorporating such an objective lens system.

2. Description of the Related Art

One way to improve the data storing density in an optical disk is to make smaller the diameter of the beam spot produced on the recording region of the disk. In order to provide a small beam spot, use may be made of an objective lens system having a large numerical aperture (NA). However, as the NA is greater (more than 0.8 for example), the positional deviation of the lens relative to the rotating disk becomes less tolerable for achieving proper data-writing or data-reading operations. Thus, when the NA is great, it is necessary to adjust the orientation of the objective lens more accurately than when the NA is relatively small, so that the lens can follow the tilt of the disk properly.

A great NA may be achievable by combining more than one lens, as shown in FIG. 11. The illustrated objective lens system 90 includes two lenses (first and second lenses) 90A, 90B aligned vertically, to provide a great overall NA of the system. To address the tilting problem of the disk, the system 90 employs a floating slider design in which the second lens 90B is carried on a slider 91. The illustrated optical disk apparatus is categorized as a "surface recording type," in which the slider 91 is held in facing relation to the recording layer (d) of the disk D. The slider 91 is provided with a coil 92 used for performing data-recording by magnetic field modulation. In the illustrated optical disk apparatus, a spherical lens is incorporated in the slider 91.

When the working distance is extremely short, the spherical lens may preferably be configured in a manner as shown in FIG. 12A or 12B. The spherical lens 90B' shown in FIG. 12A is of the so-called "hemisphere type", wherein the lens is formed into an exact half of a sphere. The lens 90B' has a hemispherical surface 90a' and a circular flat surface 90b' upon which the center O of the sphere is located. The thickness d of the lens 90B' is equal to the radius of curvature of the hemispherical surface 90a'.

The spherical lens 90B" of FIG. 12B, on the other hand, is of the so-called "supersphere type", wherein a flat cutting surface 90b" is located below the center O of the sphere. The lens 90B" has a superspherical surface 90a" whose radius of curvature (r) is smaller than the thickness (d) of the lens 90B" (d=r+r/n, where "n" is the refractive index of the lens 90B").

In comparison with the lens 90B" of the supersphere type, the lens 90B' of the hemisphere type is advantageous in having greater tolerance for the thickness of the slider 91 and for the thickness of the lens 90B' itself. Also, the lens 90B' is advantageously used even when there occurs a rather great deviation from the prescribed working distance. This is because, in the hemisphere type, light beams strike upon the surface 90a' at right angles, the surface 90a' does not have a power, and the focal point f' comes at the center O of the flat surface 90b'. In the hemisphere type lens 90B', however, the length of a light passage may significantly vary when the lens 90B' shifts in position. This is because the first lens 90A cooperating with the hemisphere type lens 90B' has a greater numerical aperture than when the supersphere type lens 90B" is used. Thus, the objective lens system 90 as a whole may fail to function properly when the two lenses 90A, 90B' are offset from each other even by a relatively slight amount. Accordingly, the tracking range may become unacceptably narrow. To compensate for this drawback, use may be made of an additional tracking mechanism. However, this scheme is disadvantageous since the disk apparatus incorporating such an additional unit is more expensive than otherwise.

When use is made of the supersphere type lens 90B", on the other hand, the objective lens system 90 composed of lenses 90A, 90B" is less vulnerable to the offset of the two lenses, whereby a wide tracking range is provided. This is due to the fact that the supersphere type lens 90B" has power, and the NA of the first lens 90A can be made small. However, since the lens 90B has power, the objective lens system is more vulnerable to the thickness variation of the slider 91 or spherical lens 90B". Also, the objective lens system may fail to function properly when there is a deviation from the prescribed working distance. Thus, to utilize the superspherical lens 90B", the tolerance of thickness for the slider 91 and the lens 90B" should be small. Unfavorably, this may lead to an increase in manufacturing cost.

SUMMARY OF THE INVENTION

The present invention has been proposed under the circumstances described above. It is, therefore, an object of the present invention to provide an objective lens system which can enjoy the advantages of both the hemisphere type and the supersphere type without suffering from their drawbacks.

Another object of the present invention is to provide an optical disk apparatus incorporating such an object lens system.

According to a first aspect of the present invention, there is provided an objective lens system that includes: a first lens provided with a first surface for allowing entry of light and with a second surface opposite to the first surface; and a second lens provided with a spherical third surface and with a flat fourth surface opposite to the third surface. The third surface faces the second surface and has a radius of curvature $r_0$. The second lens has a thickness $d_0$ and a refractive index $n_0$. The thickness $d_0$, the radius of curvature $r_0$ and the refractive index $n_0$ are determined so as to satisfy a relation: $d_0 > r_0 > n_0 d_0$.

With such an arrangement, the second lens of the present invention can function as a hybrid that combines the conventional hemisphere and supersphere types. As a result, the second lens of the present invention can not only alleviate the shortcomings of the conventional hemisphere and supersphere lenses, but also enjoy the advantages of both of the lenses.

Preferably, the thickness $d_0$, the radius of curvature $r_0$ and the refractive index $n_0$ may further satisfy the following relation: $d0-r0 < r0-n0d0$.

According to a second aspect of the present invention, there is provided an optical disk apparatus that includes: a light source; and an objective lens system. The objective lens system includes at least one lens which is provided with a spherical surface having a radius of curvature $r_0$. The lens has a thickness $d_0$ and a refractive index $n_0$. The thickness, the radius of curvature and the refractive index satisfy the following relation: $d_0 > r_0 > n_0 d_0$.

According to a third aspect of the present invention, there is provided an optical disk apparatus that includes: a light source; an aspherical first lens which light emitted from the light source enters; a second lens that includes a spherical surface and a flat surface opposite to the spherical surface, the spherical surface facing the first lens and having a radius of curvature $r_0$; and a storage disk facing the flat surface. The second lens is provided with both a spherical lens element including the spherical surface and a transparent base including the flat surface. The lens element has a thickness $d_1$ and a refractive index $n_1$, while the base has a thickness $d_2$ and a refractive index $n_2$. The radius of curvature $r_0$, the thicknesses $d_1$ and $d_2$, and the refractive indexes $n_1$ and $n_2$ satisfy the following relation: $d_1+d_2>r>\{n_1/(n_1+1)\}d_1+\{n_2/(n_2+1)\}d_2$.

Preferably, the refractive index $n_1$ is greater than the refractive index $n_2$ ($n_1>n_2$).

Preferably, the refractive indexes $n_1$ and $n_2$ may further satisfy the following relation: $0<(n_1-n_2)/n_2<0.04$.

Preferably, the second lens may serve as a slider designed to float on the storage disk by the air wedge effect when the storage disk is rotated at prescribed speed.

Preferably, the combination of the first and the second lenses may constitute a single objective lens system or unit which has a numerical aperture in a range of 0.8~0.95 for light having a wavelength of 405 nm(nanometers). Simultaneously, the first lens may have a numerical aperture in a range of 0.4~0.65 for the light of the same wavelength (i.e., 405 nm).

Other features and advantages of the present invention will become apparent from the detailed description given below with reference to the accompanying drawings.

BRIEF DESCRIPTION OF THE DRAWINGS

FIGS. 8A–8G are tables for illustrating the advantages of the present invention;

DETAILED DESCRIPTION OF THE PREFERRED EMBODIMENT

The preferred embodiments of the present invention will be described below with reference to the accompanying drawings.

Figure 1:
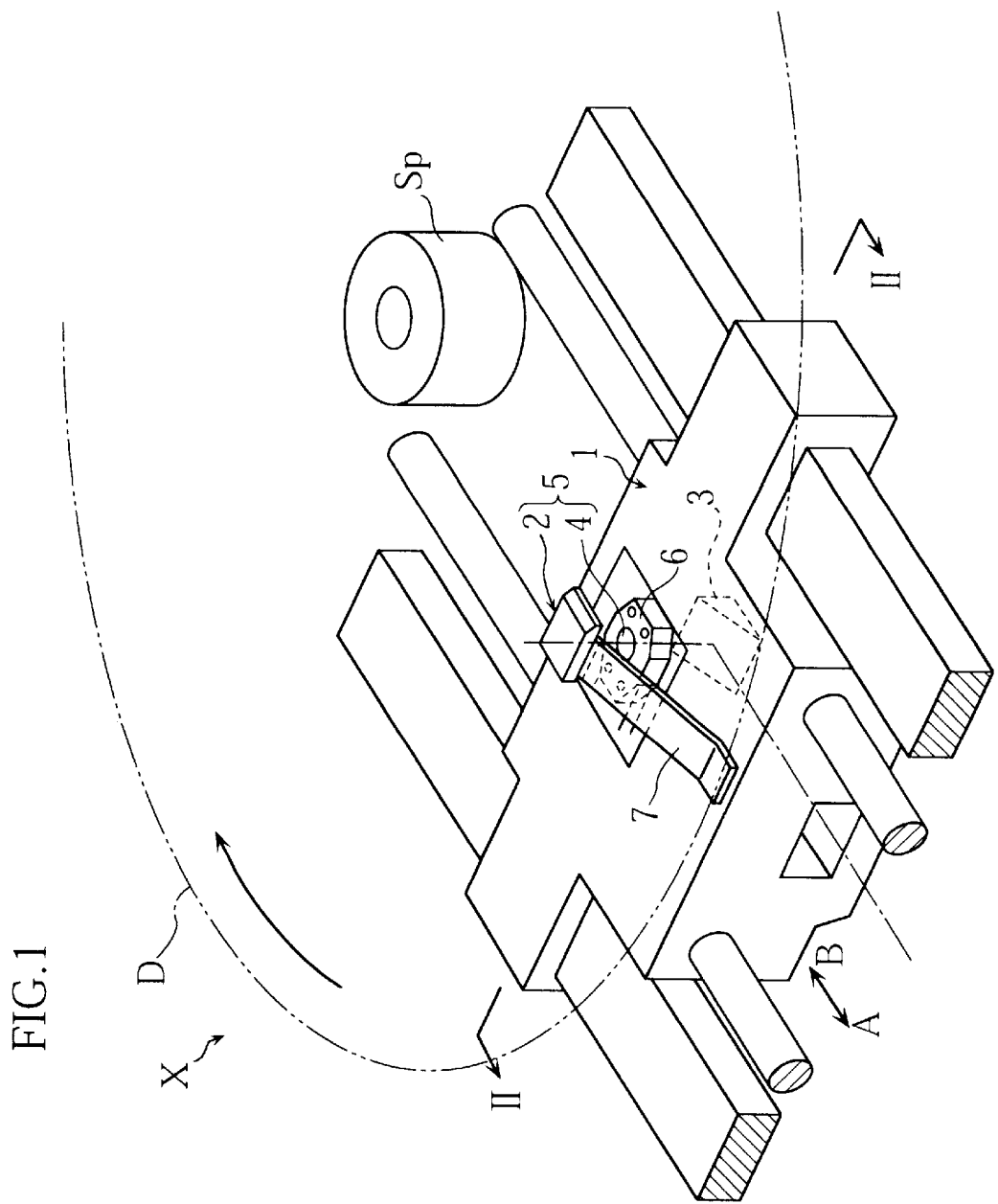
FIG. 1 is a perspective view showing the principal components of an optical disk apparatus embodying the present invention.
Figure 2:
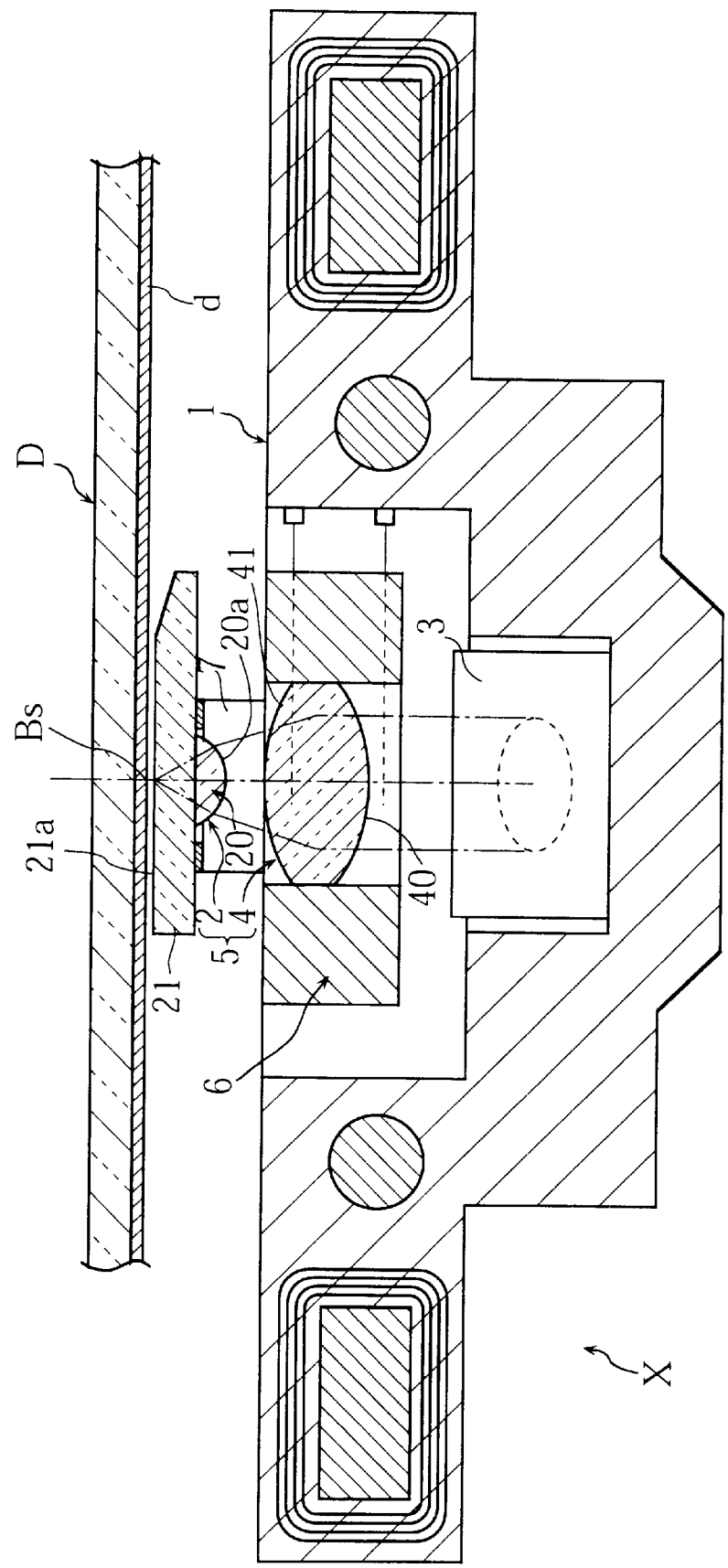
FIG. 2 is a sectional view taken along lines II—II in FIG. 1.
Figure 3:
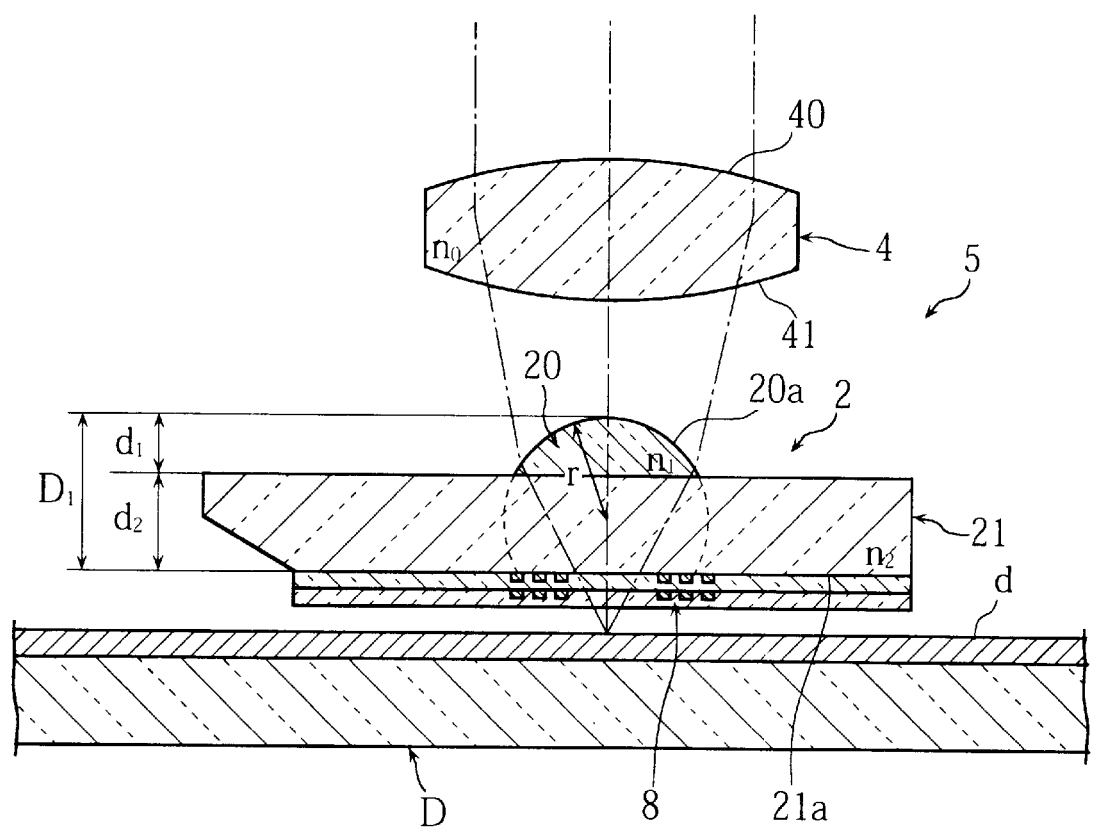
FIG. 3 is a sectional view showing the basic structure of the objective lens system of the apparatus of FIG. 1.

FIGS. 1–3 illustrate an optical disk apparatus X according to a first embodiment of the present invention. As shown in FIG. 1, the apparatus X includes a spindle Sp and a carriage 1.

The spindle Sp supports an optical disk D to rotate the disk at required speed. The carriage 1 holds a slider 2 via a suspension 7, so that the slider 2 is brought into pressing contact with the disk D at rest. As seen from FIG. 2, the slider 2 faces the recording layer d of the disk D. The carriage 1 is movable in a radial direction of the disk D (see the two-head arrow A–B in FIG. 1). The driving power for the carriage 1 may be provided by a liner actuator such as a voice coil motor. In operation, together with the carriage 1, the slider 2 is linearly moved in the radial direction of the disk D (called the "tracking direction" below). Instead of a liner actuator, a conventionally known swing arm mechanism may be used for moving the slider relative to the disk D.

As shown in FIGS. 1 and 2, the carriage 1 is provided with a mirror 3 located below the slider 2. The mirror 3 reflects a horizontal light beam upward. To produce the horizontal light, the apparatus X is provided with a stationary module (not shown) including a light source (a laser beam emitter for example), a detector, a collimator, etc.

The light reflected on the mirror 3 enters a first lens 4 provided on the carriage 1, as shown in FIG. 2. The lens 4 is an aspherical lens having a first surface 40 and a second surface 41. The first lens 4 is moved by a two-dimension actuator 6. Thus, the lens 4 is movable in a focusing direction (i.e., toward or away from the disk D) and in the above-mentioned tracking direction (radially of the disk D).

In the illustrated embodiment, as best shown in FIG. 3, the slider 2 is composed of a lens element 20 and a transparent slide base 21. The lens element 20 has a spherical surface 20a, while the base 21 has a flat surface 21a facing the recording layer d of the disk D. The slider 2 (that is, the combination of the lens element 20 and the base 21) as a whole serves as a single lens. The slider 2 and the first lens 4 mentioned above cooperate to provide a objective lens system 5 of the disk apparatus X.

As noted above, the slider 2 is urged onto the disk D by the suspension 7 when the disk D is not rotated. On the other hand, when the disk D is being rotated, the slider 2 will float on the disk D slightly (one or two microns for example) due to the so-called "air wedge effect."

The lens element 20 and the slide base 21 may be made of glass material. In the illustrated embodiment, the lens element 20 and the slide base 21 are prepared separately, and then attached to each other. Before the attachment, they may need to be subjected to grinding or other preparatory processes.

According to the present invention, the lens element 20 and the slide base 21 are produced in accordance with prescribed requirements. Specifically, it is now supposed that the lens element 20 has a thickness of $d_1$ (see FIG. 1) and a refractive index of $n_1$, that the radius of the curvature of the spherical surface 20a is r, and that the slide base 21 has a thickness of $d_2$ and a refractive index of $n_2$. Then, these parameters of the lens element 20 and base 21 should satisfy the following relations:

$$d_1+d_2>r>\{n_1/(n_1+1)\}d_1+\{n_2/(n_2+1)\}d_2 \quad (1)$$

$$n_1>n_2 \quad (2)$$

$$0<(n_1-n_2)/n_2<0.04 \quad (3)$$

Referring now to FIG. 3, the disk-facing surface 21a of the slider 2 is provided with a coil 8 protected by an insulating transparent layer. This protection layer may be made of aluminum oxide, aluminum nitride, silicon oxide, or silicon nitride. The thickness of the coil protection layer is very small (some microns) and therefore negligible in comparison with the thickness of the slider 2 (about 0.5 mm). Thus, the above numerical relations (1)–(3) do not contain the parameters about the coil protection layer. In the illustrated embodiment, the coil 8 has a two-layer structure and may be made by patterning a copper or gold layer into the prescribed configuration.

As shown in FIG. 3, the light entering the lens element 20 is caused to converge by the spherical surface 20a. Then, the light passes through the slide base 21 and goes out from the surface 21a of the base 21, to strike upon the recording layer d of the disk D. In the slider 2, as noted above, the refractive index of the lens element 20 is greater than that of the base 21 ($n_1 > n_2$). Thus, after having passed through the lens element 20, the light is caused to converge to a greater extent in passing through the slide base 21.

According to the first embodiment, the objective lens system 5 utilizes two lenses (lens 4 and slider 2) in combination. Thus, the overall numerical aperture of the objective lens system 5 can be advantageously great (e.g. in a range of 0.8–0.95), while the individual NA of the first lens 4 may be rather small (e.g. in a range of 0.4–0.65).

Figure 4A:
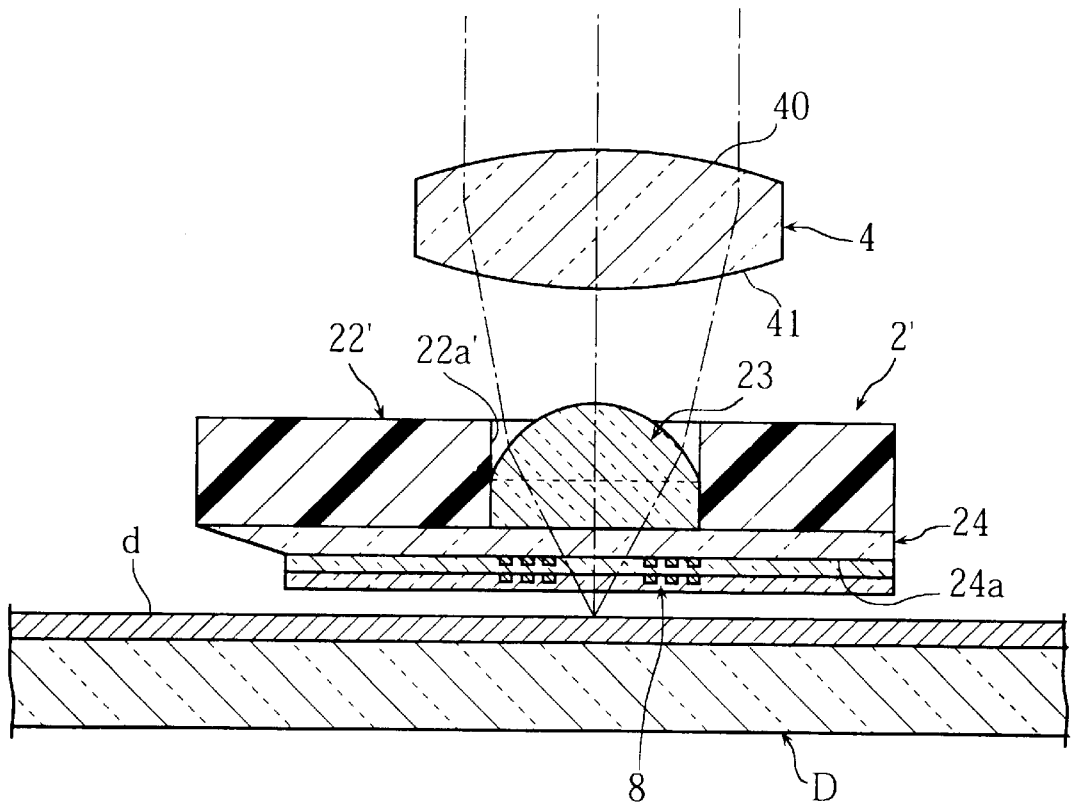
FIG. 4A is a sectional view showing a modified version of the objective lens system.
Figure 4B:
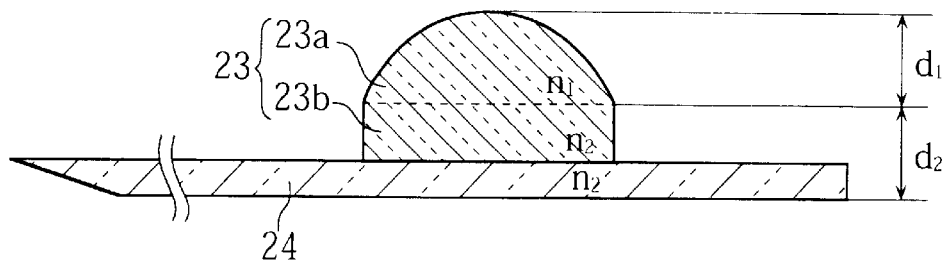
FIG. 4B is an enlarged sectional view showing the principal elements of the lens system of FIG. 4A.

Reference is now made to FIGS. 4A and 4B illustrating an objective lens system used for an optical disk apparatus according to a second embodiment of the present invention. Except for the objective lens system to be described below, the basic structure of the disk apparatus of the second embodiment is similar to that of the first embodiment. Thus, no description about the common features (the spindle, the carriage, the linear actuator, etc.) is given below.

As shown in FIG. 4A, the objective lens system of the second embodiment includes a first lens 4 and a slider 2' serving as a second lens. As illustrated, the slider 2' includes an opaque supporter 22', a lens element 23 and a transparent layer 24. The supporter 22' is formed with a through hole 22a' in which the lens element 23 is accommodated. The transparent layer 24 has a flat surface 24a facing the disk D. On the other side (i.e., opposite to the surface 24a), the transparent layer 24 is attached to the supporter 22'. As in the first embodiment, a protected coil 8 is provided on the transparent layer 24.

As shown in FIG. 4B, the lens element 23 can be divided into two sections, namely, a hemispheric section 23a and a cylindrical section 23b. The hemispheric section 23a is made of a glass material whose refractive index is $n_1$, and has a surface whose radius of curvature is r. The height or thickness of the hemispheric section 23a is $d_1$. The cylindrical section 23b is made of a glass material whose refractive index is $n_2$. The two sections 23a and 23b are formed integral with each other. The transparent layer 24 is made of a glass material whose refractive index is also $n_2$. The sum of the heights of the layer 24 and the cylindrical section 23b is equal to $d_2$. As in the first embodiment, these parameters ($n_1$, $n_2$, r, $d_1$ and $d_2$) are set so as to satisfy the above-noted relations (1)–(3).

Figure 5:
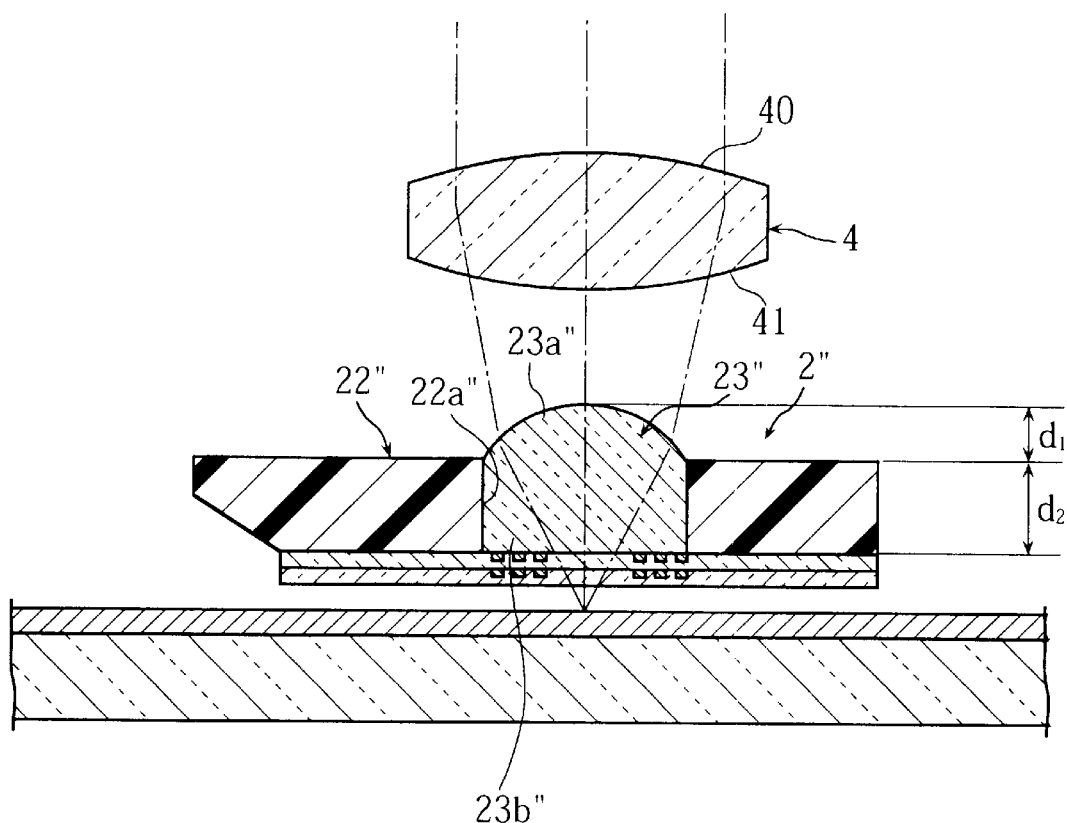
FIG. 5 is a sectional view showing another modified version of the objective lens system.

FIG. 5 illustrates an objective lens system used for an optical disk apparatus according to a third embodiment of the present invention. In this embodiment again, the objective lens system includes a first lens 4 and a second lens (slider) 2". The slider 2" is composed of a supporter 22" and a lens element 23". The supporter 22" is formed with a through hole 22a" in which the lens element 23" is accommodated. The lens element 23" includes two sections, namely, a spherical section 23a" projecting from the supporter 22" and a cylindrical section 23b" filling up the through hole 22a". As illustrated, the height of the spherical section 23a" is $d_1$. The spherical section 23a" is made of a glass material whose refractive index is $n_1$, and has an exposed surface whose radius of curvature is r. The cylindrical section 23b", on the other hand, has a height of $d_2$ and is made of a glass material whose refractive index is $n_2$. These parameters ($d_1$, $d_2$, r, $n_1$, $n_2$) satisfy the above-noted relations (1)–(3).

Figure 11:
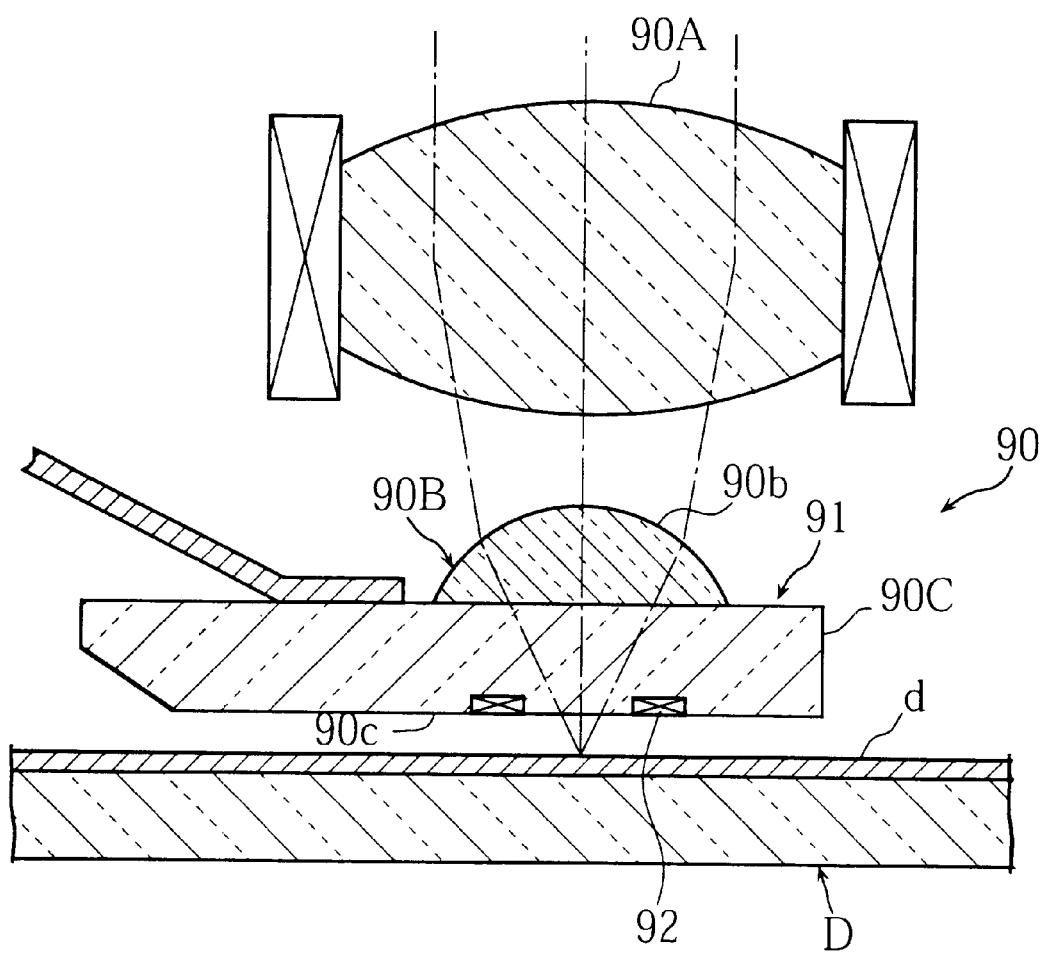
FIG. 11 is a sectional view showing a conventional objective lens system used in an optical disk apparatus.
Figure 12A:
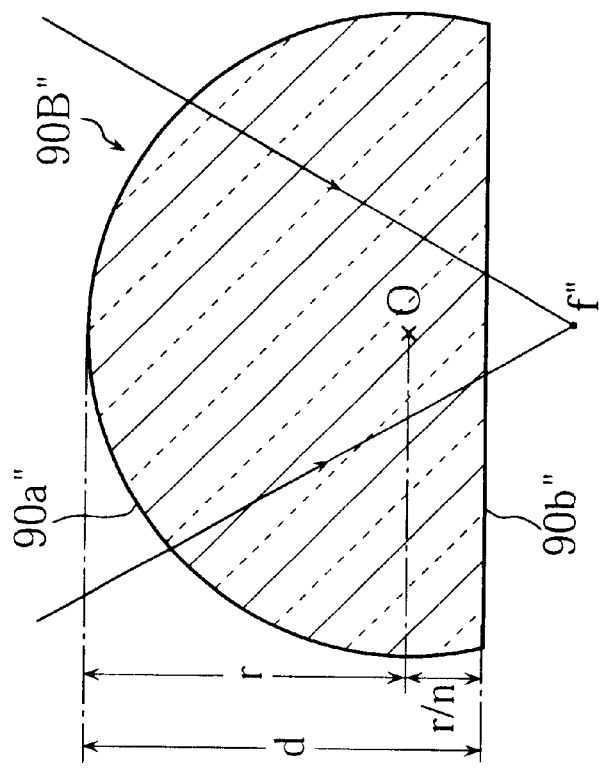
FIGS. 12A and 12B are sectional views showing conventional spherical lenses useable for the lens system of FIG. 11.
Figure 12B:
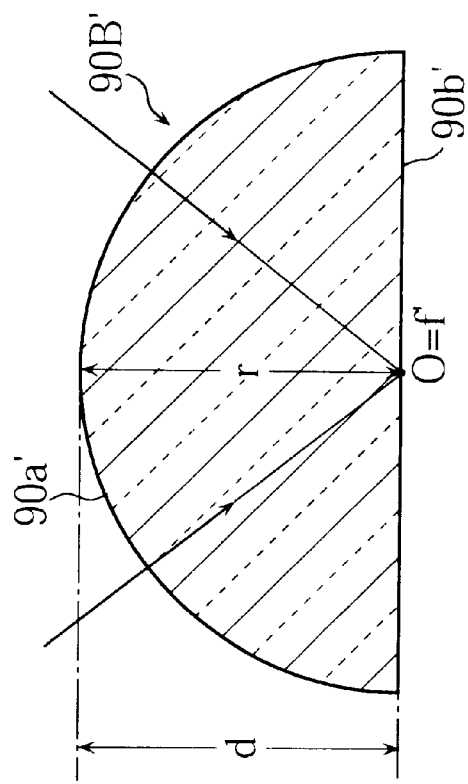

In comparison with the conventional lens system (FIGS. 11 and 12), the above-described objective lens systems of the present invention are less susceptible to adverse effects such as the dimensional variation of the first lens 4, the deviation of the working distance and the eccentricity between the first lens 4 and the lens element (20, 23a', 23a"). Due to this improved capability of coping with the adverse effects, the tracking range of the objective lens system is advantageously enlarged. The reason why the present invention can provide such an advantage will be given below by taking the lens system 5 of FIG. 3 as an example.

Figure 6:
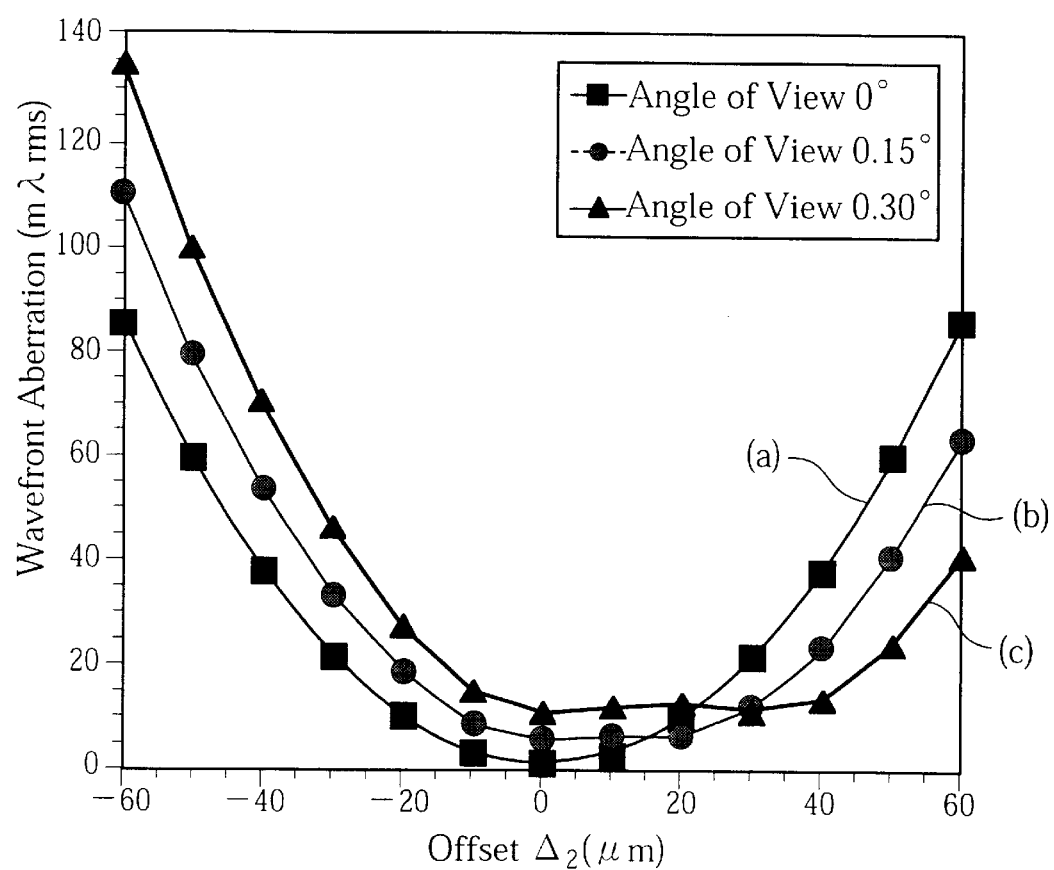
FIG. 6 shows a graph illustrating the relation between lens offset and wavefront aberration.
Figure 10A:
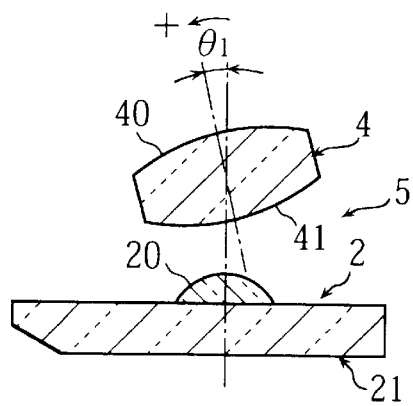
FIGS. 10A–10F illustrate margins given to an objective lens system of the present invention.
Figure 10B:
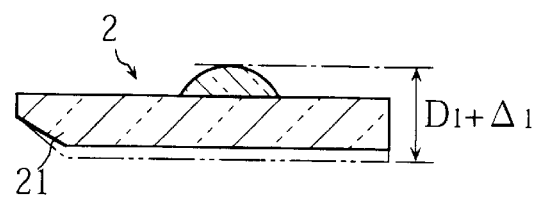
Figure 10C:
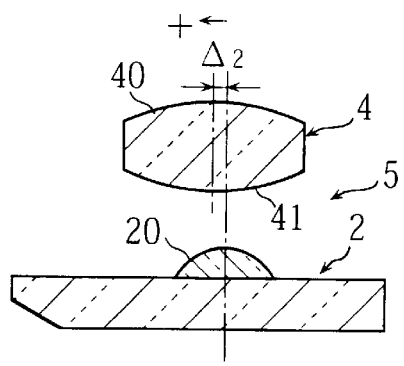

Referring to FIG. 6, the graph shows the relations between the "relative offset amount" of the two lenses of the lens system 5 and the wavefront aberration, where the relative offset amount represents how far the axis of the first lens 4 and the axis of the lens element 20 are laterally spaced from each other (see FIG. 10C). The offset $\Delta_2$ shown in FIG. 10C is defined as having a positive sign (+). An offset to the opposite direction is defined as having a negative sign (−). Turning back to the graph of FIG. 6, it shows three different curves (a), (b) and (c). The curve (a) corresponds to an instance where the "angle of view" is 0°, the curve (b) to an instance where the "angle of view" is 0.15°, and the curve (c) to an instance where the "angle of view" is 0.30°. Here, the angle of view is defines as an angle made between the axis of the lens element 20 and the axis of the first lens 4, as shown in FIG. 10A. The illustrated angle $\theta_1$ is defined as having a positive sign (+), while the opposite inclination is defined as having a negative sign (−).

The graph of FIG. 6 reveals the following two facts. The first one is that the offset $\Delta_2$ and the angle of view should ideally be 0 to prevent wavefront aberration, and if this cannot be achieved, the offset $\Delta_2$ and the angle of view should be as small as possible. The second one is that the curve (a) is symmetrical with respect to the vertical line (not shown) passing through the 0-offset point, whereas the other curves (b) and (c) are not. In the cases of the curves (b) and (c), the offset points of minimum wavefront aberration shift to the right (to the positive side). This shows that when the angle of view is positive, the tracking operation of the optical disk apparatus should be performed with the first lens 4 being offset positively for alleviating the adverse effect of the wavefront aberration.

Figure 7:
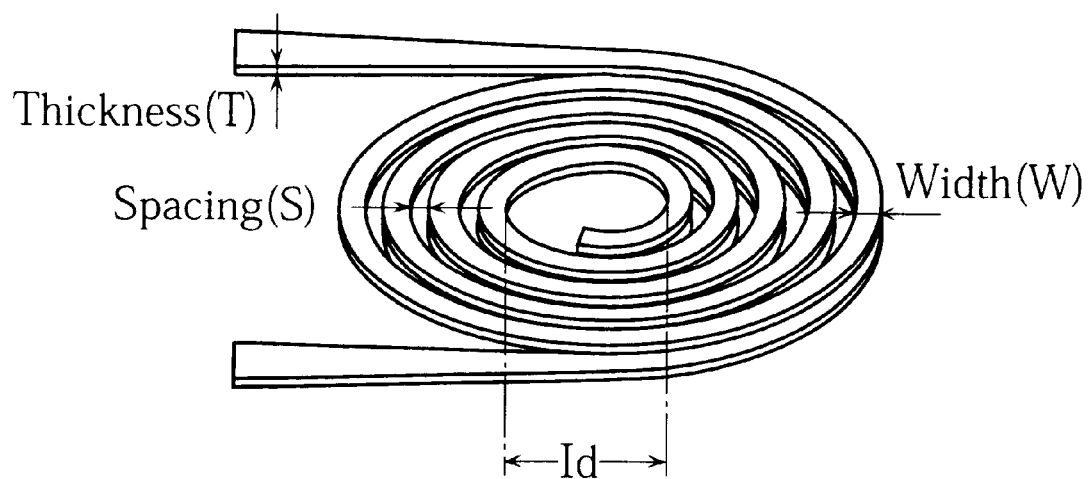
FIG. 7 is an enlarged view showing a two-layer coil used for the objective lens system of the present invention.

Now, consideration is given to the coil 8 (see FIGS. 3 and 7). The coil 8, as shown in FIG. 7, has an inner diameter Id. Generally, a coil tends to have a greater inductance as its inner diameter becomes greater. This holds for the coil 8 of the present invention. The inventors measured inductance for a coil having a relatively great inner diameter (simply called "large coil" below) and a coil having a relatively small inner diameter (simply called "small coil" below). The results are shown in Table 1 of FIG. 8A.

Table 1 shows that inductance becomes greater when the inner diameter of the coil is greater. As known in the art, a coil having a great inductance tends to exhibit poor frequency characteristics, thereby hindering high-speed recording. Thus, the inner diameter of a coil is preferably small. In this case, accordingly the optical disk apparatus should be designed to have a small tracking control margin.

As described above, the embodiment of FIG. 3 satisfies the numerical relations (1), (2) and (3). As seen from the relation (1), an inequality "$d_1+d_2>r$" holds for the objective lens system 5. This shows that the second lens (or slider) 2 of the system 5 is similar, in dimensional arrangement, to the supersphere type lens 90B" of FIG. 12B (where d>r) rather than the hemisphere type lens 90B' (where d=r). On the other hand, comparing an inequality "$r>\{n1/(n1+1)\}d1+\{n2/(n2+1)\}d2$ of the above relation (1) with the conventional relation "$d=r+r/n>r$" (FIG. 12B), it is found that the second lens 2 is locally closer to the hemisphere type lens 90B' than to the supersphere type lens 90B".

Further, the above relations (2) and (3) also show that the second lens 2 of the present invention is similar to the hemisphere type than the supersphere type.

Specifically, due to the relation (2) (i.e., $n_1 > n_2$), the light beams will converge to a greater extent in passing through the slider base 21 than in passing through the lens element 20. Thus, the base 21 has a positive power, and the slider 2 as a whole has a positive power, as in the case of the supersphere type lens 90B". As a result, the radius of curvature for the lens element 20 is rendered advantageously small, and the NA of the aspherical first lens is reduced.

The relation (3) requires that the amount "$(n_1-n_2)/n_2$" should be greater than 0 but smaller than 0.04 (i.e., 4%). Due to this restriction, the second lens (slider) 2 is prevented from being too close to the supersphere type lens 90B".

As noted above, the second lens 2 of the present invention, satisfying the relations (1)–(3), is similar to the hemisphere type lens 90B', while also being provided with a positive power, as in the supersphere type lens 90B". In this sense, the second lens 2 is a hybrid of the above two types that enjoys the advantages of the respective types.

The above-described facts can also be deduced from Tables 2–5 shown in FIGS. 8B–8E, respectively.

According to Table 2, the aberration depends on the relations between the refractive index $n_1$ of the lens element 20 and the refractive index $n_2$ of the slider base 21. Specifically, when $n_1$ is smaller than $n_2$ ($n_1$=1.78, $n_2$=1.79), some aberration is observed (13 m$\lambda$.rms). This is because light beams are caused to diverge in passing through the base 21. When $n_1$ is greater than $n_2$ ($n_1$=1.79, $n_2$=1.78), on the other hand, substantially no aberration will appear, since light beams are caused to converge in passing through the base 21. In this case, the base 21 has a positive power, whereby the slider 2 as a whole has a positive power. In Table 2, "r" represents the radius of curvature of the lens element 20, "$d_1$" represents the thickness of the lens element 20, and "$d_2$" represents the thickness of the slider base 21.

Figure 9:
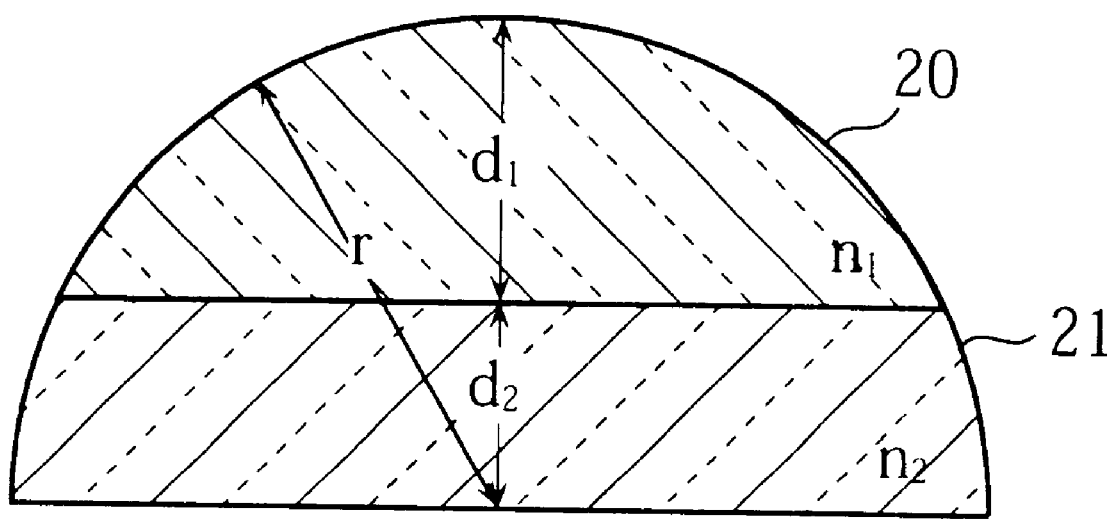
FIG. 9 is a sectional view showing a lens used for measuring the difference in optical path length.

As seen from Table 3, the optical path length in the slider 2 may vary depending on the relation between $n_1$ and $n_2$. The optical path length may also depend on the convergence angles (0°, 16° and 32°). The measurement of the optical path length may be performed by using a spherical lens (shown in FIG. 9) whose radius of curvature (r) is 1 mm. In the illustrated example, when $n_1$ and $n_2$ are unequal, the lens element 20 and the base 21 are both rendered to have a thickness of 0.5 mm.

Table 3 shows that when $n_1$ and $n_2$ are equal ($n_1=n_2$=1.6 or 1.7), the optical path length remains the same (=1.6 or 1.7) even when the convergence angle varies (0°, 16° and 32°). When $n_1$ is smaller than $n_2$ ($n_1$=1.6, $n_2$=1.7), the optical path length becomes longer (1.65<1.6520806<1.6592613) as the convergence angle becomes greater. Conversely, when $n_1$ is greater than $n_2$ ($n_1$=1.7, $n_2$=1.6), the optical path length becomes shorter (1.65>1.6480462>1.6413131) as the convergence angle becomes greater. This means that as the refractive index of the lens element 20 is made greater than the refractive index of the base 21, the optical path length becomes shorter (i.e., the spherical lens becomes more similar to the supersphere type lens 20B").

Tables 4 and 5 of FIGS. 8D–8E show the variation of possible wavefront aberration (Table 5) depending upon the refractive index ($n_1$) and radius of curvature (r) of the lens element 20 under three different conditions 1–3 (Table 4). The measurement of the wavefront aberration is performed for two cases (Table 5): Case 1 where a tolerance of +10 $\mu$m is allowed for the thickness of the slider 2, and a tolerance of +1 $\mu$m is allowed for the floating amount of the slider 2; and Case 2 where the slider 2 is shifted from the optical axis by 20 $\mu$m.

As shown in Table 4, the overall NA of the objective lens system, the prescribed floating amount of the slider, the wavelength of light, the thickness ($d_1$) of the spherical lens element and the thickness ($d_2$) of the slider base are common to Conditions 1–3. The thickness of the bonding layer is negligible. Conditions 1–3, however, are different in the following respects. In Conditions 1 and 2, the refractive index $n_0$ of the aspherical first lens is 1.62247, while it is 1.529724 in Condition 3. Further, in Condition 1, the refractive index $n_2$ of the slider base is 1.62247, while it is 1.529724 in Conditions 2 and 3.

As seen from Table 5, the wavefront aberration in Case 1 increases as the refractive index $n_1$ becomes greater under any one of Conditions 1–3. Conversely, the wavefront aberration in Case 2 decreases as the index $n_1$ becomes greater. These facts show that, supposing that the overall NA of the objective lens system is held constant, the objective lens system as a whole can enjoy the same advantages as the supersphere lens by rendering the refractive index $n_1$ of the lens element 20 greater than the refractive index $n_2$ of the slider base 21.

Generally, in an optical disk apparatus, the light entering the objective lens system may have a total wavefront aberration of about 30 m$\lambda$.rms. When the apparatus is a magneto-optical type designed to perform data-recoding and data-reproducing, it is desirable that the light emitted from the objective lens system toward the storage disk may have a total wavefront aberration of about 50 m$\lambda$.rms at most. In light of this, the total wavefront aberration may desirably be no greater than 40 m$\lambda$.rms when the disk apparatus is fabricated with practical mass production margins (for example, the allowable vertical deviation of the slider in a floating state is +1 $\mu$m for the standard floating amount of 2 $\mu$m, and the thickness tolerance of the slider is +10 $\mu$m, as in Case 1 noted above). To this end, as seen from Table 5, the ratio (n1–n2)/n2 is desirably as great as possible within a range of 0~4% (the above relation (3)). Duet to this setting, the spherical lens of the lens system locally resembles the supersphere type rather than the hemisphere type.

As described above, the slider (second lens) 2 of the present invention, satisfying the relations (1)–(3), can have a positive power, whereby the first lens 4 is allowed to have a small NA. As a result, the slider 2 can have great thickness tolerance and a long working distance. Further, according to the present invention, the first lens 4 is allowed to be offset largely from the lens element 20, thereby securing a wide tracking range.

Reference is now made to Table 6 shown in FIG. 8F. Table 6 presents the specifications (design settings) of two objective lens systems: an objective lens system incorporating a slider satisfying the above relations (1)–(3) ("Present Invention"); and another objective lens system incorporating a conventional hemisphere type lens. These two lens systems are subjected to aberration measurements, with prescribed margins provided.

Figure 10D:
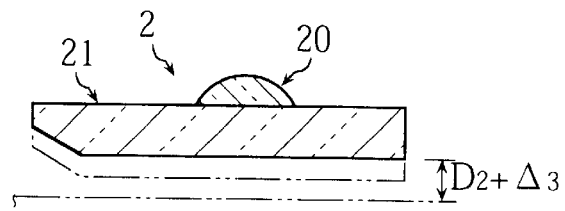
Figure 10E:
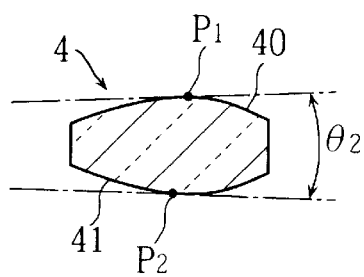
Figure 10F:
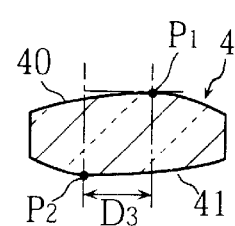

The results of the above measurements are presented in Table 7 shown in FIG. 8G. Each of the margins is practical one that can occur in producing optical disk apparatus. The margins are schematically illustrated in FIGS. 10A–10F. Specifically, the angle of view $\theta_1$, as shown in FIG. 10A, is an angle made between the prescribed reference axis (axis of the lens element 20) and the axis of the first lens 4. The slider thickness tolerance $\Delta_1$, as shown in FIG. 10B, is the variation of the slider thickness relative to the prescribed design thickness $D_1$ of the slider 2. The relative offset $\Delta_2$, as shown in FIG. 10C, is the amount of the lateral deviation of the first lens 4 relative to the reference axis. The float variation $\Delta_2$, as shown in FIG. 10D, is the amount of the vertical deviation of the slider 2 relative to the prescribed floating height $D_2$ of the slider 2. The interfacial angle $\theta_2$, as shown in FIG. 10E, is the angle made between two tangential lines. As illustrated, one tangential line extends through the apex $P_1$ of the first surface 40 of the first lens 4, while the other tangential line extends through the apex $P_2$ of the second surface 41 of the lens 4. The surface offset $D_3$, as shown in FIG. 10F, is the amount of the lateral deviation between the normal line at the apex $P_1$ of the first surface 40 and the normal line at the apex $P_2$ of the second surface 41.

As seen from Table 7, the worst aberration is smaller in the objective lens system of the present invention than in the objective lens system incorporating the hemisphere type lens. Table 7 also shows that the worst aberration is greater in the lens system of the present invention when only the slider thickness tolerance and the float variation are provided. This is because the slider of the present invention serves as a lens transformed from the hemisphere type toward the supersphere type.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. An objective lens system comprising:
a first lens that includes a first surface for allowing entry of light and a second surface opposite to the first surface; and
a second lens that includes a spherical third surface and a flat fourth surface opposite to the third surface, the third surface facing the second surface and having a radius of curvature $r_0$, the second lens having a thickness $d_0$ and a refractive index $n_0$;
wherein the thickness $d_0$, the radius of curvature $r_0$ and the refractive index $n_0$ satisfy a following relation:

$$d_0 > r_0 > n_0 d_0.$$

2. The objective lens system according to claim 1,
wherein the thickness $d_0$, the radius of curvature $r_0$ and the refractive index $n_0$ further satisfy a following relation:

$$d_0 - r_0 < r_0 - n_0 d_0.$$

3. An optical disk apparatus comprising:
a light source; and
an objective lens system including at least one lens which is provided with a spherical surface having a radius of curvature $r_0$, the lens having a thickness $d_0$ and a refractive index $n_0$;
wherein the thickness $d_0$, the radius of curvature $r_0$ and the refractive index $n_0$ satisfy a following relation:

$$d_0 > r_0 > n_0 d_0.$$

4. An optical disk apparatus comprising:
a light source;
an aspherical first lens which light emitted from the light source enters;
a second lens that includes a spherical surface and a flat surface opposite to the spherical surface, the spherical surface facing the first lens and having a radius of curvature $r_0$; and
a storage disk facing the flat surface;
wherein the second lens comprises both a spherical lens element including the spherical surface and a transparent base including the flat surface, the lens element having a thickness $d_1$ and a refractive index $n_1$, the base having a thickness $d_2$ and a refractive index $n_2$; and
wherein the radius of curvature $r_0$, the thicknesses $d_1$ and $d_2$, and the refractive indexes $n_1$ and $n_2$ satisfy a following relation:

$$d_1 + d_2 > r > \{n_1/(n_1+1)\}d_1 + \{n_2/(n_2+1)\}d_2.$$

5. The optical disk apparatus according to claim 4,
wherein the refractive index $n_1$ is greater than the refractive index $n_2$.

6. The optical disk apparatus according to claim 5,
wherein the refractive indexes n1 and n2 further satisfy a following relation:

$$0 < (n_1 - n_2)/n_2 < 0.04.$$

7. The optical disk apparatus according to claim 4,
wherein the second lens serves as a slider designed to float on the storage disk by an air wedge effect when the storage disk is rotated.

8. The optical disk apparatus according to claim 4,
wherein a combination of the first and the second lenses constitutes an objective lens system having a numerical aperture in a range of 0.8–0.95 for light having a wavelength of 405 nm, the first lens having a numerical aperture in a range of 0.4–0.65 for light having a wavelength of 405 nm.

* * * * *